(12) United States Patent
Coutinho et al.

(10) Patent No.: US 10,963,325 B2
(45) Date of Patent: Mar. 30, 2021

(54) DETERMINING THE HEALTH OF A STORAGE DRIVE

(71) Applicant: Hewlett-Packard Development Company, L.P., Houston, TX (US)

(72) Inventors: Roberto Coutinho, Porto Alegre (BR); Marcio Maraschin, Porto Alegre (BR); Matheus Eichelberger, Porto Alegre (BR); John Landry, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 97 days.

(21) Appl. No.: 16/065,623

(22) PCT Filed: Apr. 22, 2016

(86) PCT No.: PCT/US2016/028751
§ 371 (c)(1),
(2) Date: Jun. 22, 2018

(87) PCT Pub. No.: WO2017/184157
PCT Pub. Date: Oct. 26, 2017

(65) Prior Publication Data
US 2019/0121685 A1    Apr. 25, 2019

(51) Int. Cl.
*G06F 11/00* (2006.01)
*G06F 11/30* (2006.01)
(Continued)

(52) U.S. Cl.
CPC ........ *G06F 11/008* (2013.01); *G06F 11/3034* (2013.01); *G06F 11/3075* (2013.01);
(Continued)

(58) Field of Classification Search
CPC .... G06F 11/008; G06F 17/40; G06F 11/3476; G06F 16/24578; G06F 11/3075;
(Continued)

(56) References Cited

U.S. PATENT DOCUMENTS 5,828,583 A * 10/1998 Bush ..................... G06F 11/004
702/185
6,574,754 B1    6/2003 Smith
(Continued)

FOREIGN PATENT DOCUMENTS

| | | |
|---|---|---|
| CN | 105260279 | 1/2016 |
| WO | WO-2014051603 A1 | 4/2014 |
| WO | WO-2015176388 A1 | 11/2015 |

OTHER PUBLICATIONS

Wikipedia "Machine learning" pages, retrieved from https://en.wikipedia.org/wiki/Machine_learning (Year: 2020).*
(Continued)

*Primary Examiner* — Yair Leibovich
(74) *Attorney, Agent, or Firm* — Trop Pruner & Hu PC

(57) ABSTRACT

A technique includes, for each storage drive of a plurality of storage drives, determining a metric associated with the storage drive based at least in part on a plurality of attributes associated with the storage drive; and determining a health of a given storage drive of the plurality of storage drives based at least in part on the metric associated with the given storage drive and the metric associated with at least one other storage drive of the plurality of storage drives.

14 Claims, 8 Drawing Sheets

(51) Int. Cl.
*G06F 11/34* (2006.01)
*G06F 17/40* (2006.01)
*G06F 16/2457* (2019.01)

(52) U.S. Cl.
CPC ...... *G06F 11/3452* (2013.01); *G06F 11/3476* (2013.01); *G06F 11/3485* (2013.01); *G06F 16/24578* (2019.01); *G06F 17/40* (2013.01); *G06F 2201/81* (2013.01)

(58) Field of Classification Search
CPC ............. G06F 11/3485; G06F 11/3034; G06F 11/3452; G06F 2201/81; G06F 11/3409; G06F 11/3447
USPC ....................................................... 714/47.2
See application file for complete search history.

(56) References Cited

U.S. PATENT DOCUMENTS

| | | | |
|---|---|---|---|
| 7,487,401 B2 | 2/2009 | Urmanov et al. | |
| 8,316,263 B1 | 11/2012 | Gough | |
| 8,406,096 B1 * | 3/2013 | Edling | G11B 15/689 360/69 |
| 8,566,637 B1 | 10/2013 | Puhov et al. | |
| 9,141,457 B1 | 9/2015 | Ma et al. | |
| 9,244,790 B1 | 1/2016 | Ma | |
| 10,339,455 B1 * | 7/2019 | Parush-Tzur | G06N 5/04 |
| 2010/0324945 A1 | 12/2010 | Hessing | |
| 2012/0110344 A1 | 5/2012 | Sadovsky et al. | |
| 2015/0117174 A1 * | 4/2015 | Alber | G11B 27/36 369/53.41 |
| 2015/0277797 A1 | 10/2015 | Lv et al. | |

OTHER PUBLICATIONS

Wikipedia "Regression analysis" pages, retrieved from https://en.wikipedia.org/wiki/Regression_analysis (Year: 2020).*

Midnight Cowboy ~ "Best Free Hard Drive Heaith Monitoring and Diagnostic Programs" ~ gizmo's freeware ~ Apr. 21, 2015 ~ 7 pages.

Suchatpong Thanadon et al: "Hard Disk Drive failure mode prediction based on industrial standard using decision tree learning", 2814 11th International Conference on Electrical Engineering/Electronics, Computer, Telecommunications and Information Technology (ECTI-CON), IEEE, 14 May 2814 (2814-85-14), pp. 1-4, XP832619518, DOI: 18. 1189/ECTICON.2814.6839839 [retrieved on 2814-86-18] * the whole document *.

* cited by examiner

DETERMINING THE HEALTH OF A STORAGE DRIVE

BACKGROUND

A storage drive (a hard disk drive or a solid state drive, as examples) may include a self-monitoring, analysis and reporting technology (S.M.A.R.T.) system for purposes of monitoring and reporting various performances and telemetry indicators. A computer system may rely on the indicators provided by a storage drive's S.M.A.R.T. system for purposes of assessing the health of the drive.

DETAILED DESCRIPTION

Figure 1:
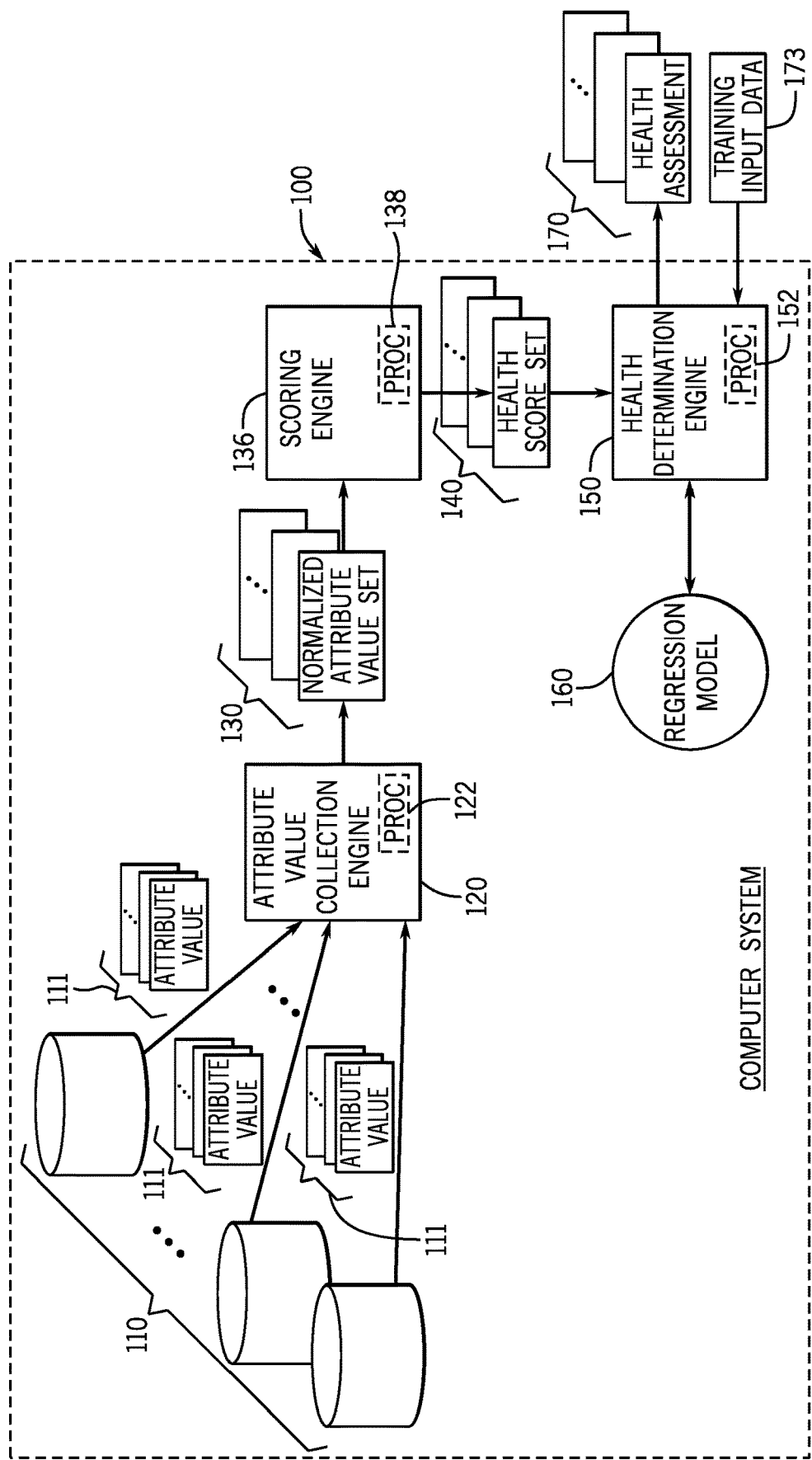
FIGS. 1 and 6 are schematic diagrams of computer systems according to example implementations.

Timely detecting when a storage drive (a hard disk drive or a solid state drive, as examples) is about to fail may be important for purposes of allowing preventative action (failover operations, hot swapping, data backup operations, and so forth) to be taken to minimize the impact of the drive's failure on a computer system. Therefore, a computer system may monitor storage drive performance for purposes of continually assessing the drive's health.

One way for a computer system to assess the health of a storage drive is to evaluate one or multiple performance indicator values that are provided, or reported, by the drive. For example, a storage drive may report values that are associated with different S.M.A.R.T. attribute categories, such as a read error rate, a throughput performance, a spin-up time, a seek error rate, a read channel margin, and so forth. By comparing the reported values to associated thresholds, the computer system may obtain a picture of the storage drive health.

A challenge with relying solely on S.M.A.R.T. reporting to assess storage drive health is that aspects of the reporting may depend on the manufacturer of the storage drive. In this manner, the specific S.M.A.R.T. attribute categories (out of all of the possible S.M.A.R.T. attribute categories) that are reported by the storage drive and the value ranges for the reported attribute categories may vary from one manufacturer to another. As such, S.M.A.R.T. attribute reporting may provide a non-standardized picture of storage drive health. Accordingly, such an approach may be unsuitable for use in a computer system, which monitors the health of a relatively large population of storage drives that are associated with many manufacturers.

In accordance with example implementations that are described herein, a big data analytics approach is used by a computer system to determine the health of a given storage drive of a relatively large population of storage drives (hundreds of storage drives, for example). More specifically, in accordance with example implementations that are described herein, for a population of storage drives, a computer system transforms attribute values (S.M.A.R.T. attribute values, for example) that are reported by the storage drives into standardized, or normalized, attribute values; determines metrics (health scores for, example) for the storage drives based at least in part on the normalized attribute values; and determines the health of a given storage drive of the population based at least in part on one or multiple metrics for the given storage drives and one or multiple metrics for at least one other storage drive of the population. In accordance with example implementations, the computer system applies machine-based learning to determine a metric threshold based on observed time profiles of the metrics for the population so that the health of a given storage drive of the population may be assessed by comparing a metric for the given storage drive to the metric threshold.

As a more specific example, FIG. 1 depicts a computer system 100 in accordance with example implementations. The computer system 100 may be, as examples, a local area network (LAN), a wide area network (WAN), a server, a client, a storage area network (SAN), a desktop computer, and so forth. Regardless of its particular form, the computer system 100 has a population of storage drives 110. In this manner, the storage drives 110 may be hard disk drives, optical storage drives, solid state drives (SSDs), drives associated with a combination of some of these storage technologies, and so forth. In accordance with example implementations, the computer system 100 may determine an associated set 140 of health scores (i.e., metrics) for each storage drive 110 of the population. As an example, a given set of scores 140 for a storage drive 110 may include an overall health score for the storage drive 110, as well as health scores for associated performance-related attributes for the storage drive 110.

More specifically, in accordance with example implementations, the computer system 100 includes an attribute value collection engine 120, which acquires values (called "attribute values 111" herein) that represent performance indicators for each storage drive 110. As an example, in accordance with some implementations, the "attribute value 111" may be a S.M.A.R.T. attribute value that is associated with a particular S.M.A.R.T. attribute category, such as a raw read error count, a command timeout count, a reallocation sector count, an end-to-end error count, a command timeout count, a reallocated sector count, a current pending sector count, an off-line uncorrectable error count, and so forth.

For example implementations that are described herein, a higher attribute value corresponds to a better performance indicator than a lower attribute value. Moreover, in accordance with example implementations, the computer system 100 assumes that the health of the storage drive 110 degrades over time. Thus, in general, a given attribute value may have be at or near its maximum value for a relatively new storage drive 110, and the attribute value may decline over time, as the health of the storage drive 110 degrades with age. It is noted, however, that in accordance with further example implementations, the attribute values may not vary with performance, as an increased attribute value may correspond to a decreased performance; and, in accordance with further example implementations, some attribute values may increase as the health of the storage drive 110 degrades over time and other attribute values may decrease as the health of the storage drive 110 degrades over time.

In general, a given storage drive 110 may be associated with a particular manufacturer and a particular model number. Thus, some of the storage drives 110 may be associated with different manufacturers; and moreover, some storage drives 110 associated with the same manufacturer may be associated with different model numbers. As a consequence, the attributes values 111 may be "non-standardized" in that different storage drives 110 may provide attributes values 111 for some attribute categories (some S.M.A.R.T. attribute categories, for example) but not for other attribute categories. Moreover, even when storage drives 110 provide attributes values 111 belonging to the same attribute category, the storage drives 110 may provide the attribute values for different ranges. For example, a first storage drive 110 may report values 111 for a particular attribute category in a range from 50 to 100, whereas a second storage drive 110 (associated with a different manufacturer than the first storage drive 110) may report values 111 for the same attribute category in a range from 40 to 120.

The attribute value collection engine 120, in accordance with example implementations, filters and normalizes the attribute values 111 to form a corresponding set 130 of standardized normalized attribute values for each storage drive 110. As part of the filtering, the attribute value collection engine 120 collects relevant attribute values and discards irrelevant attribute values for purposes of standardizing the set of attribute categories for the drive population. In this context, a "relevant" attribute category refers to the attribute category belonging to a defined set of attribute categories, and an "irrelevant" attribute category refers to the attribute category not belonging to this set. As described herein, in accordance with example implementations, the computer system 100 may dynamically update, or change, the definition of which attribute categories belong to the relevant set of attribute categories, and as such, the membership of the relevant attribute category set may change over time. In general, the computer system 100 deems the attribute categories belonging to the relevant set as being the most significant or influential in determining storage drive health. It is noted that the filtering by the attribute value collection engine 120 may also include removing bad attribute data.

In accordance with example implementations, the attribute value collection engine 120 may further supplement the data that is reported by the storage drive 110. For example, the attribute value 111 may be associated with additional information, such as a "manufacturer field;" and the attribute value collection engine 120 may fill in the manufacturer field based on the model's name.

The normalization transforms the attribute values 111 into a commonly shared scale. In this manner, storage drive manufacturers may not readily provide the ranges for the attribute values, and the attribute value range for the same attribute category may vary from one manufacturer to the next. For purposes of normalizing the attribute values, the attribute value collection engine 120 may monitor/analyze the attribute value dataset provided by each storage drive 110 for purposes of determining the maximum and minimum values for each relevant attribute category. Based on the determined ranges, the attribute value collection engine 120 may transform the attribute values 111 into the normalized value sets 130 that share a common scale. For example, in accordance with some implementations, the normalized value may vary from 0 to 1 (corresponding to a percentage from 0% to 100%). For example, the attribute value collection engine 120 may determine that an attribute "X" may, for manufacturer A, vary from 0 to 100 and determine for manufacturer B, attribute "X" may vary from 20 to 100. Thus, for this example, the attribute value collection engine 120 transforms a value for attribute "X" of 50 for manufacturer A into a normalized value of 0.5 and transforms, a value for attribute "X" for manufacturer B of 40 into a normalized value of 0.25.

In accordance with example implementations, the attribute value collection engine 120 may perform a merging/ aggregation function that aggregates the previous attribute values to the attribute dataset. For example, in accordance with example implementations, the attribute value collection engine 120 may be formed by a processor 122 executing R language machine executable instructions, which invokes the execution functions over a data frame vertically.

In accordance with example implementations, the computer system 100 includes a scoring engine 136 that determines a set 140 of associated health scores for each storage drive 110 based on the associated normalized attribute value set 130. In this manner, in accordance with example implementations, the set 140 of health scores for a storage drive 110 includes an overall health score for the storage drive 110 and scores (called "attribute scores) for each relevant attribute category. Moreover, in accordance with example implementations, a health determination engine 150 of the computer system 100 uses a regression model 160 to generate health assessments 170 for the storage drives 110 based at least in part on the health scores. As examples, a given health assessment 170 may be an estimated remaining life time for an associated storage drive 110, and/or the health assessment 170 may be a health grade level (good, slightly degraded, highly degraded, and so forth) for the storage drive 110.

More specifically, in accordance with example implementations, the health determination engine 150 is constructed to apply a machine learning-based regression analysis to the observed health scores for the storage drive population to learn the time decay of the overall health score as a function of the attribute scores. Based on the learned time decay, the health determination engine 150 may, in accordance with example implementations, determine a threshold score; and the health determination engine 150 may then compare the overall health score of a given storage drive 110 to the threshold score for purposes of assessing the health of the storage drive 110 (reporting a health grade level, or scale, for the storage drive 110 in the form of the health assessment 170, for example).

In general, the machine learning regression addresses the problem of forecasting when a storage drive 110 is about to fail, or crash, by predicting a continuous value for a given variable conditioned on one or multiple other variable values. Here, the health determination engine 150, in accordance with example implementations, may predict a threshold score conditioned on the observed health scores for the drive population; and as described below, the health determination engine 150 may use this threshold score as a benchmark for purposes of determining a health assessment 170 for any of the storage drives 110.

In accordance with example implementations, for purposes of training the regression model 160, the health determination engine 150 may determine the time that a particular storage drive 110 fails by observing when the storage drive 110 goes off line, or is removed from the population of drives 110 (i.e., the health determination engine 150 may assume that the removed storage drive 110 has reached its end of life). The health determination engine 150 may also acquire information pertaining to the status of a removed storage drive 110 (such as whether or not the drive 110 has failed) via training input data 173. In general, the training input data 173 represents external data that may be provided by a human administrator, for example. The training input data 173 may contain additional labeled training data that is used by the health determination engine 150 to train the regression model (i.e., labeled training data in addition to the data derived from the engine 150 monitoring the time decay of the drive population), in accordance with example implementations.

In accordance with example implementations, the health determination engine 150 may, as part of the regression analysis, adaptively identify the attribute categories that most significantly influence the health of the storage drive 110. In this manner, in accordance with example implementations, the health determination engine 150 may identify a top number of attribute categories, which most significantly influence the observed time decay of the drive's overall health score, i.e., the engine 170 may correspondingly identify the relevant attribute categories. The health determination engine 150 may communicate with the attribute value collection engine 120 for purposes of programming, or instructing, the attribute value collection engine 120 with the relevant attribute categories. The "top number" may be a predetermined number of most influential attribute categories, in accordance with example implementations. In accordance with some implementations, the health determination engine 150 may identify the top number of attribute categories on a regular basis (on a periodic basis, for example), so that the relevant attribute categories used by the attribute value collection engine 120 may change over time. Moreover, in accordance with some implementations, the health determination engine 150 may increase or decrease the number of members of the relevant attribute set.

Figure 2:
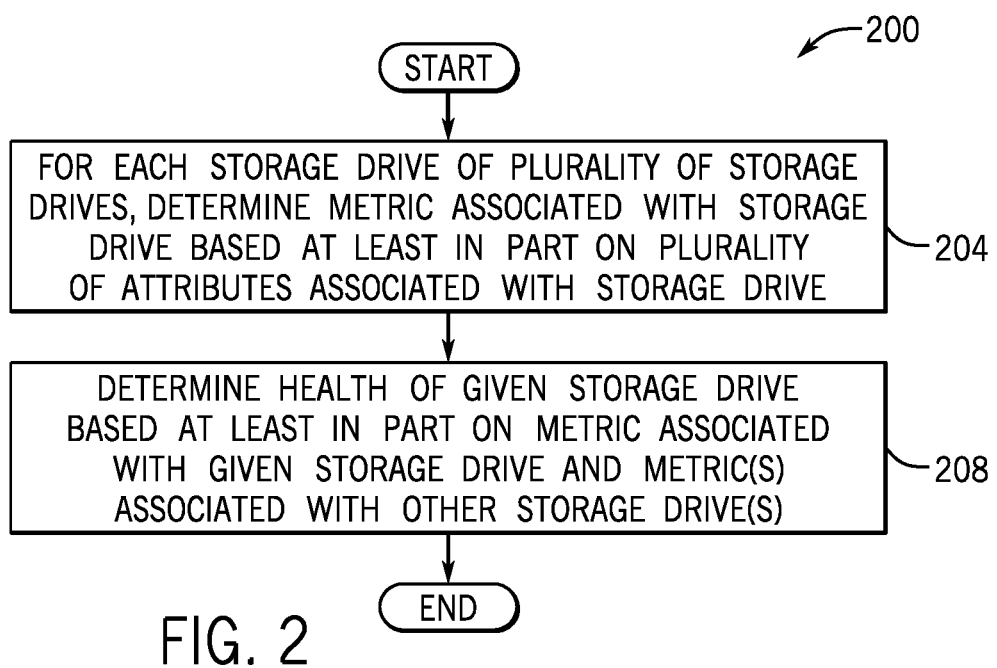
FIGS. 2 and 5 are flow diagrams depicting techniques to determine the health of a storage drive according to example implementations.

Referring to FIG. 2 in conjunction with FIG. 1, thus, in general, in accordance with example implementations, the computer system 100 may perform a technique 200, which includes, for each storage drive of a plurality of storage drives, determining (block 204) a metric associated with the storage drive based at least in part on a plurality of attributes associated with the storage drive. The health of the given storage drive may be determined (block 208) based at least in part on a metric associated with a given storage drive and one or multiple other metrics associated with one or multiple other storage drives, pursuant to block 208.

Referring back to FIG. 1, in accordance with some implementations, the attribute value collection engine 120, scoring engine 136 and health determination engine 150 may contain processors 122, 138 and 152, respectively. In this manner, a given processor may be, for example, a central processing unit (CPU), which contains one or multiple processing cores. Depending on the particular implementation, one or more of the engines 120, 136 and 150 may share a given CPU. In this manner, in accordance with some implementations, the engines 120, 136 and 150 may be formed at least in part by machine executable instructions, or "software" executing on a CPU. In accordance with further example implementations, one or more of the engines 120, 136 and 150 may be formed from dedicated hardware components (dedicated hardware circuits, for example). Thus, many implementations are contemplated, which are within the scope of the appended claims.

In accordance with some implementations, the scoring engine 136 determines a given attribute health score by multiplying the corresponding normalized attribute value by an associated weight; and the scoring engine 136 determines the overall health score for a given storage drive 110 by summing the attribute health scores that are associated with the drive 110. In general, the weight represents how important the health determination engine 110 deems the associated attribute health score to be for purposes of assessing or determining the overall storage drive health, as the computer system 100 may determine that some relevant attribute categories influence the time decay of the storage drive health more than other relevant attribute categories. As an example, in accordance with example implementations, the health determination engine 150 may regularly determine, via the regression analysis, the degree of influence for each of the relevant attribute categories and communicate with the scoring engine 136 to instruct, or program, the engine 136 with the attribute weights. Thus, the weighting may be dynamic in nature and may change as a result of the ongoing regression analysis.

In accordance with example implementation's, scoring engine 136 may further associate each attribute health score with an attribute health score threshold, which represents a lower limit for the attribute score before the associated storage drive health is considered critical. Thus, in accordance with example implementations, the health determination engine 150 may consider a given storage drive 110 to have a failing, or critical, health based on either 1. its overall health score (calculated from a weighted combination of the attribute scores) declining for a certain percentage of a predetermined threshold (as determined by the regression analysis); or 2. a given attribute health score for the storage drive 110 falling below the associated attribute health score threshold. The health determination engine 150 may, in accordance with example implementations, adjust the attribute health score thresholds based on the results of the regression analysis. Thus, similar to the weights, the threshold assignment may be dynamic and change as a result of the ongoing regression analysis.

As a more specific example, the attribute value collection engine 120 may be programmed to collect attribute values belonging to the seven relevant attribute categories that are listed below:

TABLE 1

Example Attribute Weights and Thresholds

| ATTRIBUTE CATEGORY | WEIGHT | THRESHOLD (%) |
|---|---|---|
| Re-alloc SecCt | 2 | 70 |
| Raw Read Err | 2 | 50 |
| End-end ED/C | 1 | 50 |
| Command Timeout | 1 | 45 |
| Reallocated | 1 | 40 |
| Curr Pending | 1 | 40 |
| Off-Line UCC | 2 | 70 |

In addition to the relevant attribute categories, Table 1 represents the associated weight and the associated attribute health score threshold for each of the attribute categories. For the example, of Table 1, the raw read error (called "Raw Read Err" in Table 1 and assigned a weight of 50%) has more significance than the number of current pending requests (called "Curr Pending" in Table 1 and assigned a weight of 40%), because, for this example, the health determination engine 150 determined that the raw read error degradation had more impact on the overall health of the storage drive 110 than the number of current pending requests.

As mentioned above, the attribute health score threshold is a value, which represents, as a percentage (or as a corresponding fraction of one), how long an associated attribute health score value may decay until the value is considered critical to the overall health calculation. For the example, of Table 1, the reallocation sector count (called "Re-alloc SecCt" in Table 1) has an associated threshold of 70 percent, which means when the corresponding attribute health score reaches 70 percent, then the associated storage drive 110 has reached a point of failure. The thresholds may be revisited and adjusted over time by the health determination engine 150, in accordance with example implementations.

In accordance with example implementations, the computer system 100 may provide a visual indication of the current health status of an associated storage drive 110 in the form of a health grade bar. In this manner, as further described below, the health grade bar may be displayed on a display monitor of the computer system 100 as part of a graphical user interface (GUI). The health grade bar visually represents 1. the overall health score for the storage drive (in terms of a percentage) from zero percent (the lowest score) to one hundred percent (the highest score); and 2. the attribute health scores that contribute to the overall health score. In general, the height of the health grade bar represents the overall health score for the storage drive 110.

Figure 3:
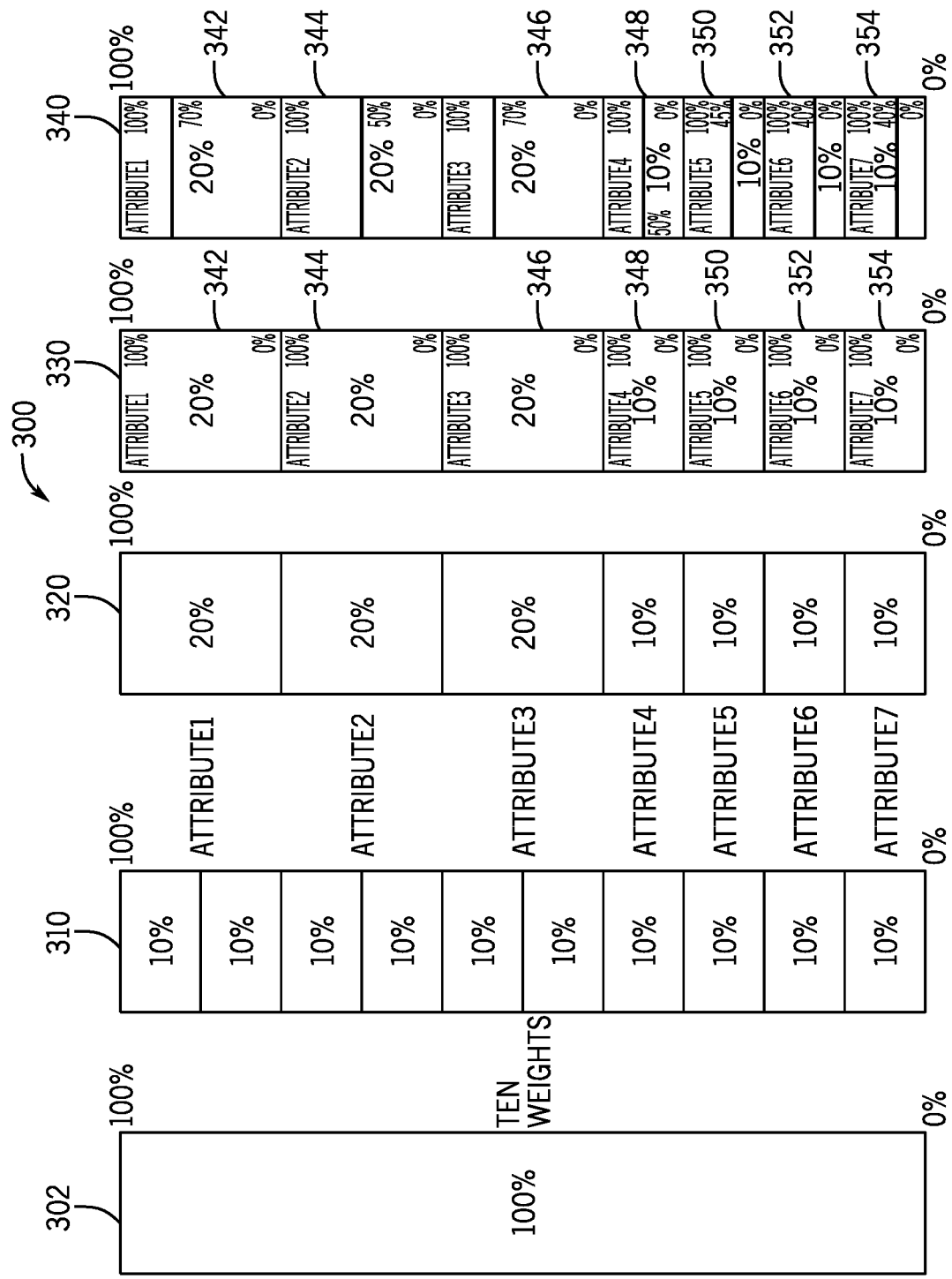
FIG. 3 illustrates a process to generate a health grade bar for a storage drive according to an example implementation.

Referring to FIG. 3 in conjunction with FIG. 1, in accordance with example implementations, a health grade bar may be determined, as depicted by example process 300. First, the health grade bar has a maximum percentage of 100, (corresponding to the maximum overall health score) as illustrated at 302, such as when the associated storage drive 100 is relatively new. As illustrated at 310, the health grade bar may have (as an example) ten available weights, (i.e., ten percent each), and seven (as an example) relevant attributes may be selected for the score. As illustrated at reference numeral 320, these seven attributes are assigned different associated threshold weights to add up to 100 percent. For example, ATTRIBUTE1 is assigned a weight of 20 percent, ATTRIBUTE2 is assigned a weight of 20 percent, ATTRIBUTE3 is assigned a weight of 20 percent; and ATTRIBUTE4, ATTRIBUTE5, ATTRIBUTE6 and ATTRIBUTE7 are each assigned a weight of 10 percent. Given these weights, the attribute values are multiplied accordingly (to produce corresponding attribute scores 342, 344, 346, 348, 50, 352 and 354), and summed to produce a health grade bar, as illustrated at 330. The height of the health grade bar 330 represents the overall health score for the storage drive 110. As depicted at reference numeral 340, each attribute score may an associated attribute threshold. For example, ATTRIBUTE1 score 342 has an associated attribute threshold of 70%, and ATTRIBUTE5 score 350 has an attribute threshold of 10%. These attribute threshold markers may (as depicted in FIG. 3) or not be highlighted by corresponding visual markers in the health grade bar, depending on the particular implementation.

In accordance with example implementations, each storage drive 110 has the same health grade bar structure. With that, the attributes and thresholds may be monitored independently; and moreover, the overall health score may be monitored for purposes of determining which attribute or attributes are impacting the overall health score.

A given storage drive 110 may not report all of the relevant attributes that are considered in calculating the overall health of the storage drive 110. For example, values for a given attribute category may not be reported by a given storage drive 110. For such cases, the scoring engine 136 (FIG. 1) distributes the corresponding percentage assigned to the missing attribute category to the other relevant attribute categories of the health grade bar, considering each weight. For example, if a given missing attribute category has a weight of 10, then the scoring engine 136 distributes the 10 percent weight among the remaining 90 percent.

As mentioned above, in accordance with example implementations, the weighting that is applied by the scoring engine 136 may be adaptive in that a new attribute category may be added to the relevant set, whereas an existing attribute category may be dropped from the relevant set. In accordance with example implementations, if values for a specific attribute category are reported after the beginning of the calculation of the health score, the scoring engine 136 considers it and rearranges the thresholds and the overall health score to reflect the impact of the new attribute. Moreover, the scoring engine 136 may rearrange the thresholds, weights, and health to reflect the impact of any attribute category being dropped.

In accordance with example implantations, the scoring engine 136 may calculate the attribute health score as follows:

$$AttributeHealth(Attribute) = \frac{(AttributeValue * 100)}{MaxAttrValueByManufacturer}, \quad \text{Eq. 1}$$

where "MaxAttrValueByManufacturer" represents the maximum value observed for a given attribute category that is with a model and manufacturer. The decay of a given attribute may be calculated as follows:

$$AttributeDecay(Attribute) = \frac{AttributeHealth(Attribute) * RelativeArea}{100}, \quad \text{Eq. 2}$$

where "RelativeArea" represent the relative attribute's area in the overall health bar. The overall health of a given storage drive 110 having N attribute scores may be calculated as follows:

$$OverallHealth(DriveSN) = AttributeDecay(Attribute2) + \ldots + AttributeDecay(Attribute1) + AttributeDecay(AttributeN). \quad \text{Eq. 3}$$

Thus, by appling Eqs. 1, 2 and 3, the scoring engine 136 may determine the overall health score for a specific storage drive 110. Moreover, as described above, the health determination engine 150 may monitor the time decay of the health scores and train the regression model 160 based on this monitored decay. In accordance with example implementations, the health determination engine 150 may store data representing the health bars in a table, adding the date time of the execution each time the health bars for the storage drives 110 are determined. Over a period of time, the health bars decay, and the health determination engine 150 may use the observed decay to train the regression model 160.

Figure 4:
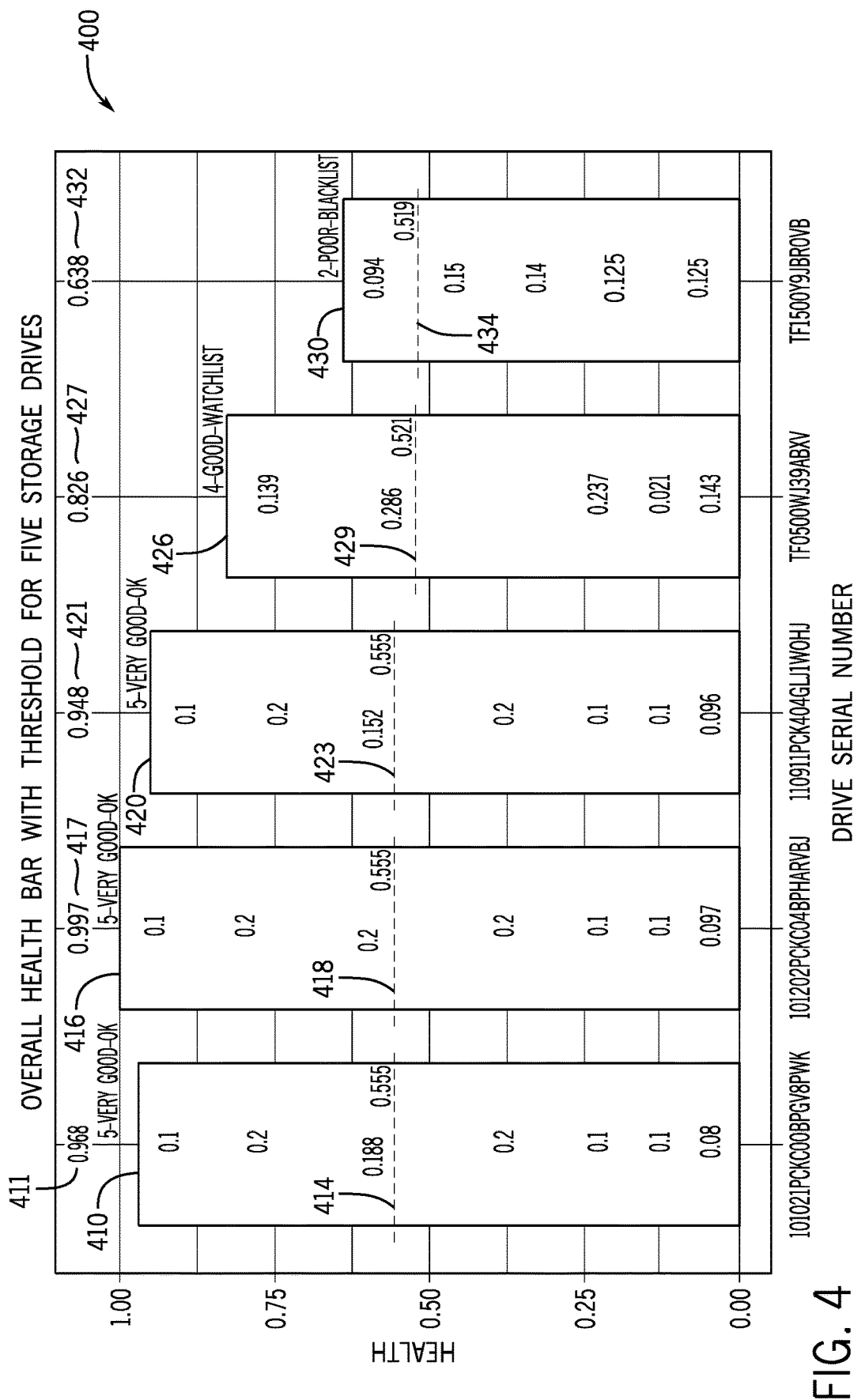
FIG. 4 is an illustration of health grade bars for storage drives according to an example implementation.

As a more specific example, FIG. 4 is an illustration 400 of health grade bars 410, 416, 420, 426 and 432 for five respective storage drives 110. In accordance with example implementations, the health determination engine 150 determines an overall health grade threshold score which the overall drive health is compared (i.e., to which the heights of the health grade bars are compared) by applying the regression analysis. Moreover, the health determination engine 150 adjusts the threshold scores, depending on the number of attribute categories being used for the associated storage drive 110. For example, the health grade bars 410, 416 and 420 are each associated with seven attribute categories and have associated threshold scores 414, 418 and 423, respectively, that are the same. The health grade bars 426 and 430 are each associated with five attribute categories (i.e., two relevant attribute categories are not reported by the associated storage drives 110) and have associated thresholds 429 and 434 that are lower (due to the fewer number of attribute categories) and are the same. Each health grade bar 410, 416, 420, 426 and 432 has an associated overall score 411, 417, 421, 427 and 432, respectively.

By comparing the overall score to its associated threshold score, the health determination engine 150 may assign a grade level, or scale, to the storage drive 110 (i.e., determine an associated health assessment 170). For example, in accordance with an example implementation, the health determination engine 150 may calculate a percentage ratio of the overall score to the threshold score and assign a health grade (Below Threshold, Highly Degraded, Reasonably Degraded, Slightly Degraded or Good) as follows:

−∞ to 0=Below Threshold
0% to 35%=Highly Degraded
36% to 65%=Reasonably Degraded
66% to 95%=Slightly Degraded
95% to 100%=Good This calculation provides a snapshot of how each storage drive 110 is performing, and when applied to the population, the calculation provides a standard method to compare storage drive health across multiple manufacturers.

Figure 7:
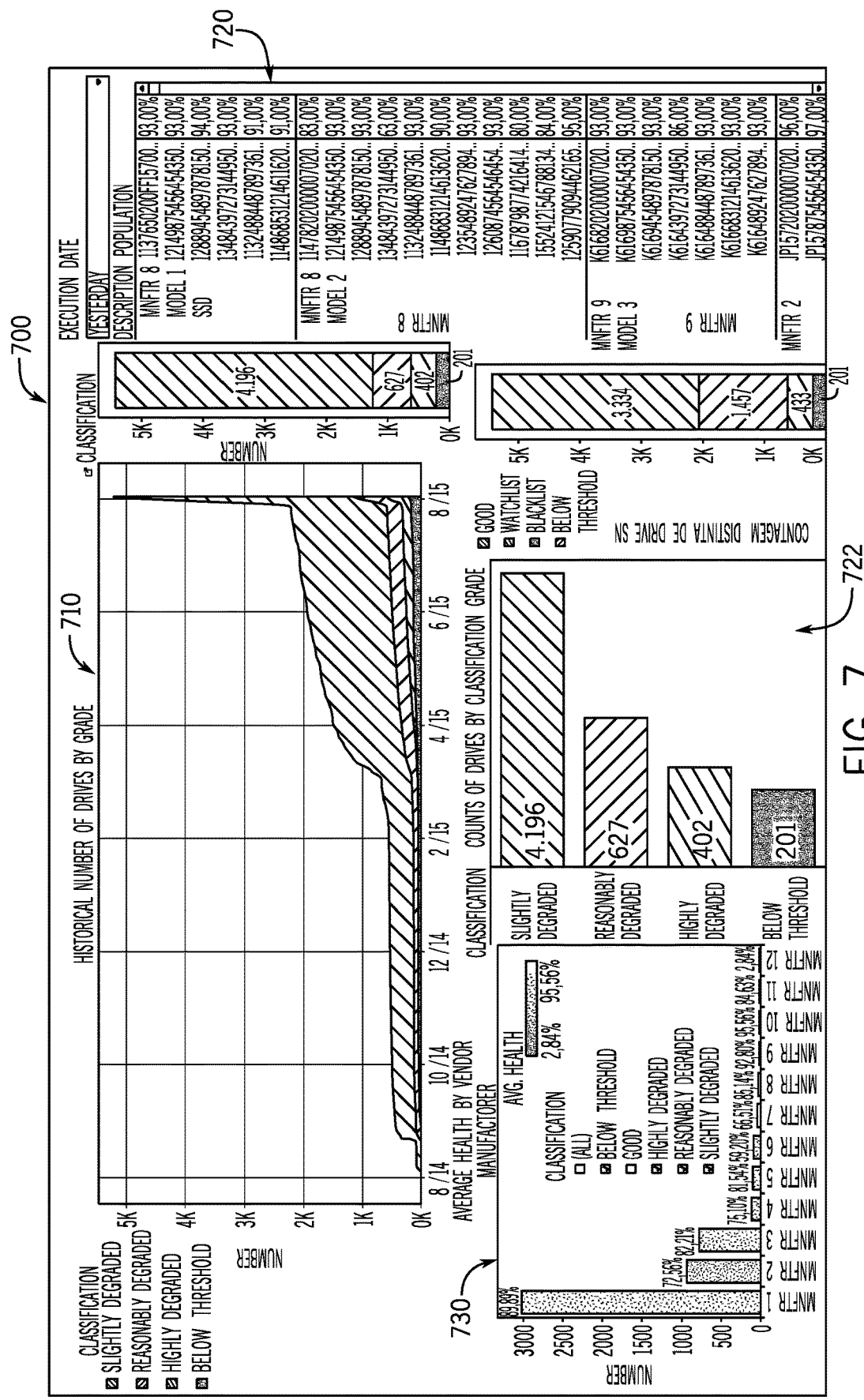
FIG. 7 is an illustration of a graphical user interface (GUI)-based dashboard associated with monitoring the health of a storage drive population according to an example implementation.

In accordance with some implementations, the computer system 100 may provide a GUI has one or multiple dashboards for monitoring drive health, illustrated by example GUI-based dashboard 700 of FIG. 7. The dashboard 700 allows the health a population of storage drives 110 to be monitored. For example, the dashboard 700 depicts the health of a number of storage drives 110 versus date. Thus, the dashboard 700 may provide a visual depiction of the overall snapshot of the health of the drive population versus time. Moreover, the dashboard 700 may depict a scrollable window 720 allowing a specific storage drive 110 to be examined, analyzing the attribute scores for the storage drive 100. Moreover, the dashboard 700 may include a histogram 710, which allows historical visualization the number of storage drives 110 per grade; a histogram 722 that provides a count of storage drives 110 per classification grade; and a histogram 730 depicting a count of degradation grades by manufacturer.

Figure 8:
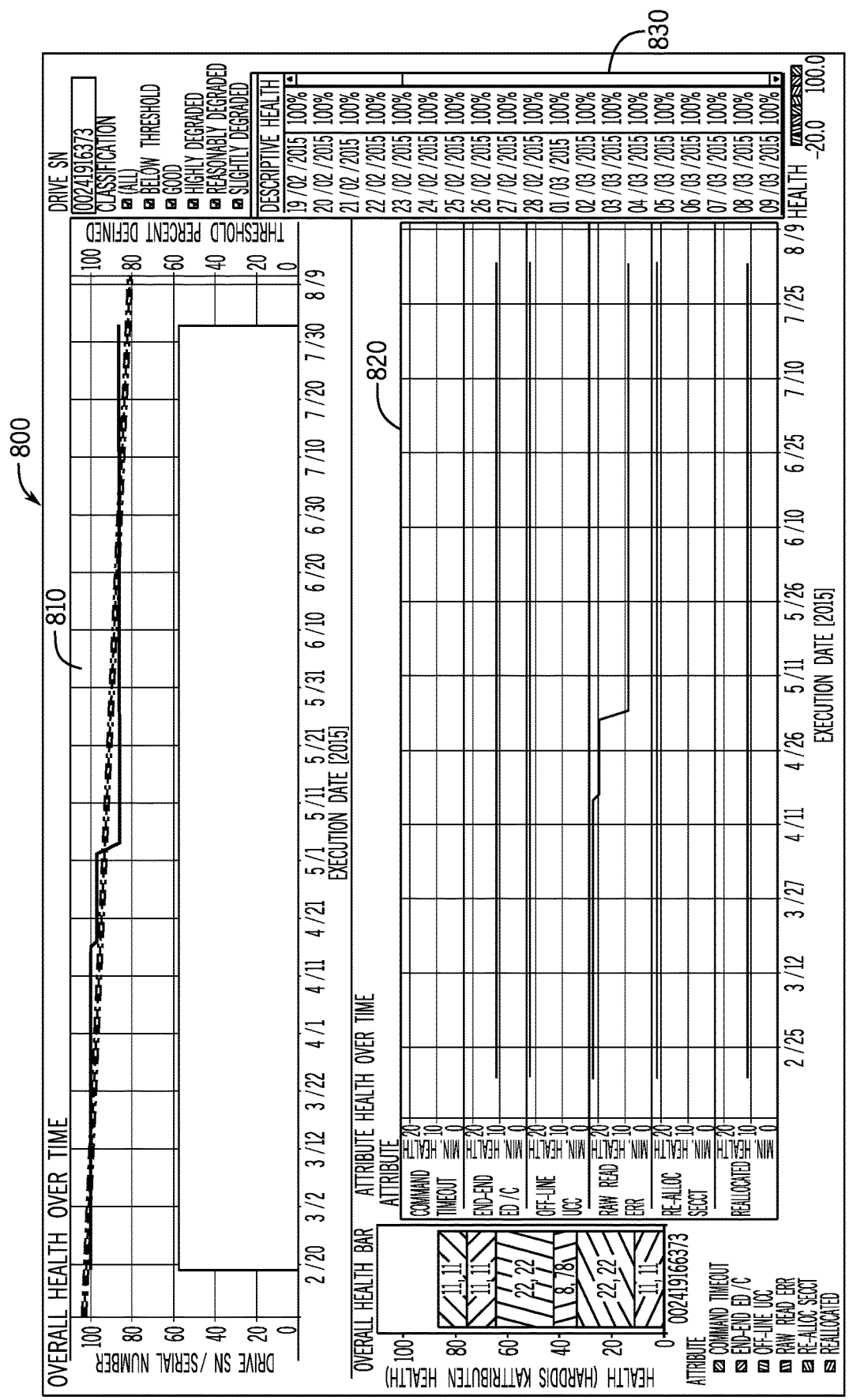
FIG. 8 is an illustration of a GUI-based dashboard associated with monitoring various aspects of storage drive health according to an example implementation.

Referring to FIG. 8, in accordance with some implementations, the computer system 100 may provide a GUI-based dashboard 800 that allows the analysis of attributes for a particular storage drive 110. In this regard, the dashboard 800 may be selected, for example, by "clicking" a particular storage drive 110 from the dashboard 700 of FIG. 7. The dashboard 800 includes, among its other features, a graph 810 depicting the overall health score of the drive storage 110 over time; a scrollable window 830 depicting the overall health score for specific dates; and a window 820 depicting the individual attribute scores for the storage drive 110 over time.

Figure 5:
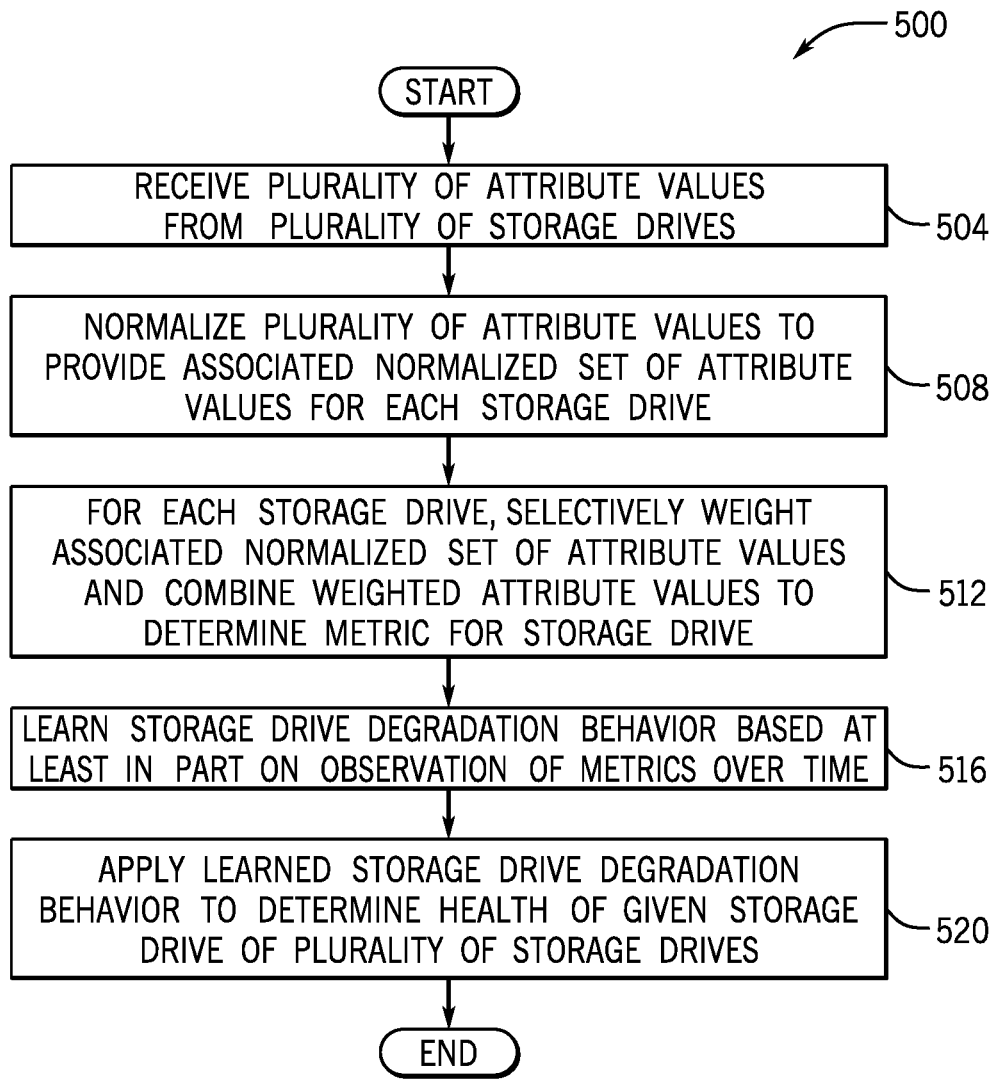

Referring to FIG. 5, to summarize, in accordance with example implementations, a technique 500 includes receiving (block 504) a plurality of attribute values from a plurality of storage drives and normalizing (block 508) the plurality of attribute values to provide an associated normalized set of attribute values for each storage drive. Pursuant to the technique 500, for each storage drive, an associated normalized set of attribute values is selectively weighted; and the weighted attribute values are combined to determine a metric for the storage drive, pursuant to block 512. Storage drive degradation behavior may then be learned (block 616) based at least in part an observation of the metrics over time. The learned storage drive degradation behavior may then be applied (block 520) to determine the health of a given storage drive of the plurality of storage drives.

Figure 6:
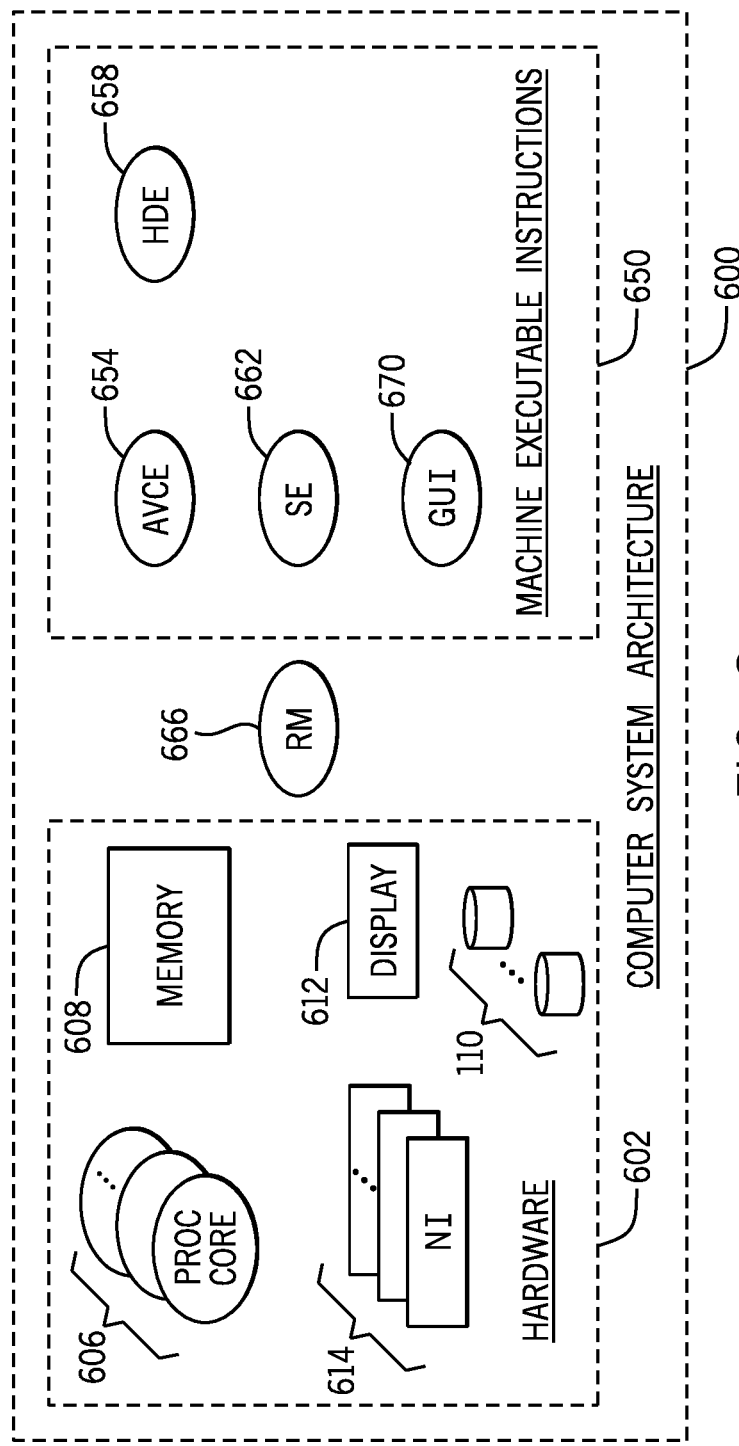

Referring to FIG. 6 in conjunction with FIG. 1, in accordance with example implementations, the computer system 100 may have an architecture 600. In general, the architecture 600 represents an actual physical machine that contains actual hardware 602 and machine executable instructions 650, or "software." The hardware 602 may include, as an example, one or multiple processing cores 606 (one or multiple CPU cores, for example) a memory 608, one or multiple network interfaces 614, a display 612, the storage drives 110, and so forth. The memory 608 may store data and machine executable instructions, or program instructions, which are executed by one or more of the processing cores 606 for purposes of performing parts or all of one or more of the techniques that are described herein. The memory 608 may be formed from semiconductor storage devices, magnetic storage devices, flash memory devices, volatile memory devices, non-volatile memory devices, a combination of some of these memory technologies, and so forth.

In general, the machine executable instructions 650 may include instructions 654, which when executed by the processing core(s) 606, form the attribute value collection engine 120; instructions 662 that when executed by the processing core(s) 606 form the scoring engine 136; and instructions 658 that when executed by the processing core(s) 606 form the health determination engine 150. Moreover, the machine executable instructions 650 may include instructions 670, which when executed by the processing core(s) 606, form a graphical user interface (GUI) 670 that displays (on the display 612, for example) representations of the health of a given storage drive, the health of multiple storage drives, the health of the entire population of storage drives, the dashboards described herein, the health grade bars and so forth. As also depicted in FIG. 6, the computer system 100 may store data 666 that represents parameters of the regression model 160.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
for each storage drive of a plurality of storage drives, collecting a metric from the each storage drive based at least in part on a plurality of attributes of multiple attribute categories from the each storage drive;
for each storage drive of the plurality of storage drives, determining a score for the each storage drive based at least in part on the plurality of attributes associated with the each storage drive;
training a machine learning-based regression model based at least in part on observed time profiles of at least some of the scores; and
determining a health of a given storage drive of the plurality of storage drives based at least in part on the metric from the given storage drive and metrics from other storage drives other than the given storage drive of the plurality of storage drives, wherein determining the health of the given storage drive comprises:
  determining a threshold based on the metrics associated with the other storage drives, wherein determining the threshold comprises applying the regression model to dynamically identify a top number of attribute categories of the multiple attribute categories which most significantly influence observed time decays of the observed time profiles to determine the threshold; and
  comparing the metric associated with the given storage drive to the threshold.

2. The method of claim 1, wherein determining the health of the given storage drive further comprises:
  determining a health grade for the given storage drive based at least in part on the comparison.

3. The method of claim 1, wherein collecting the metric from the each storage drive comprises:
  for a given attribute of the plurality of attributes, determining a range of values for the given attribute;
  normalizing a value for the given attribute based at least in part on the range; and
  using the normalized value to collect the metric from the each storage drive.

4. The method of claim 1, wherein collecting the metric from the each storage drive comprises:
  selectively weighting values for the plurality of attributes; and
  combining the selectively weighted values to collect the metric from the each storage drive.

5. The method of claim 1, wherein determining the health of the given storage drive further comprises assigning a health grade from a plurality of health grades to the given storage drive, the method further comprising:
  assigning a health grade level to at least one other storage drive of the plurality of storage drives; and
  graphically displaying a count of the plurality of storage drives per health grade versus time.

6. A system comprising:
  an attribute value collection engine comprising a processor to, for each storage drive of a plurality of storage drives, collect a metric from the each storage drive based at least in part on a plurality of attributes of multiple attribute categories from the each storage drive;
  a scoring engine comprising a processor to, for each storage drive of the plurality of storage drives, determine a score for the each storage drive based at least in part on the plurality of attributes associated with the each storage drive; and
  a health determination engine comprising a processor to:
    train a machine learning-based regression model based at least in part on observed time profiles of at least some of the scores, and determine a health score of a given storage drive; and
    determine a health of a given storage drive of the plurality of storage drives based at least in part on the metric from the given storage drive and metrics from other storage drives other than the given storage drive of the plurality of storage drives, wherein determining the health of the given storage drive comprises:
      determining a threshold based on the metrics associated with the other storage drives, wherein determining the threshold comprises applying the regression model to dynamically identify a top number of attribute categories of the multiple attribute categories which most significantly influence observed time decays of the observed time profiles to determine the threshold; and
      comparing the metric associated with the given storage drive to the threshold.

7. The system of claim 6, wherein the storage drives are associated with a plurality of manufacturers.

8. The system of claim 6, wherein the attribute value collection engine normalizes the plurality of attributes to a commonly shared scale.

9. The system of claim 6, wherein the health determination engine assigns a degradation classification to the given storage drive based at least in part on the score determined for the given storage drive.

10. The system of claim 6, wherein the scoring engine, for each storage drive, weights the plurality of attributes according to a predetermined weighting scheme.

11. An article comprising a non-transitory computer readable storage medium to store instructions that, when executed by a computer, cause the computer to:
  for each storage drive of a plurality of storage drives, collect a metric from the each storage drive based at least in part on a plurality of attributes of multiple attribute categories from the each storage drive;
  for each storage drive of the plurality of storage drives, determine a score for the each storage drive based at least in part on the plurality of attributes associated with the each storage drive;
  train a machine learning-based regression model based at least in part on observed time profiles of at least some of the scores; and
  determine a health of a given storage drive of the plurality of storage drives based at least in part on the metric from the given storage drive and metrics from other storage drives other than the given storage drive of the plurality of storage drives, wherein determining the health of the given storage drive comprises:
    determining a threshold based on the metrics associated with the other storage drives, wherein determining the threshold comprises applying the regression model to dynamically identify a top number of attribute categories of the multiple attribute categories which most significantly influence observed time decays of the observed time profiles to determine the threshold; and
    comparing the metric associated with the given storage drive to the threshold.

12. The article of claim 11, wherein the instructions, when executed by the computer, further cause the computer to:
  selectively weight values for the plurality of attributes; and
  combine the selectively weighted values to collect the metric from the each storage drive.

13. The article of claim 11, wherein the instructions, when executed by the computer, further cause the computer to filter out attribute values provided by the plurality of storage drives and adapt the filtering over time based at least in part on learned storage drive behavior.

14. The article of claim 11, wherein the instructions, when executed by the computer, further cause the computer to assign a health grade to at least one other storage drive of the plurality of storage drives.

* * * * *